US012761059B2

(12) United States Patent
Rauer et al.

(10) Patent No.: US 12,761,059 B2
(45) Date of Patent: Oct. 13, 2026

(54) METHOD FOR PUTTING A LEVEL MEASURING DEVICE INTO OPERATION

(71) Applicant: VEGA Grieshaber KG, Wolfach (DE)

(72) Inventors: Winfried Rauer, Fischerbach (DE); Daniel Schultheiss, Hornberg (DE); Jürgen Skowaisa, Schiltach (DE); Stefan Kaspar, Hofstetten (DE); Florian Burgert, Gengenbach (DE); Andreas Bregger, Wolfach (DE); Tobias Weis, Simonswald (DE); Andreas Schmid, Fischerbach (DE)

(73) Assignee: VEGA Grieshaber KG, Wolfach (DE)

( * ) Notice: Subject to any disclaimer, the term of this patent is extended or adjusted under 35 U.S.C. 154(b) by 275 days.

(21) Appl. No.: 18/049,074

(22) Filed: Oct. 24, 2022

(65) Prior Publication Data

US 2023/0142967 A1 May 11, 2023

(30) Foreign Application Priority Data

Nov. 5, 2021 (EP) .................................... 21206634

(51) Int. Cl.

| | |
|---|---|
| ***G01F 23/284*** | (2006.01) |
| ***G01S 7/40*** | (2006.01) |
| ***G01S 13/88*** | (2006.01) |

(52) U.S. Cl.
CPC .................................. *G01F 23/284* (2013.01)

(58) Field of Classification Search
CPC ...... G01F 23/284; G01F 25/24; G01F 23/804; G01F 23/296; G01F 23/2962; G01F 23/28; G01F 25/20; G01S 7/038; G01S 7/40; G01S 13/88; G01S 7/41; G01S 15/88; G01S 7/292; G01S 13/10; G06F 17/16
USPC .................................. 342/124; 73/290, 1.73
See application file for complete search history.

(56) References Cited

U.S. PATENT DOCUMENTS 5,614,911 A * 3/1997 Otto ...................... G01F 23/284 342/124
7,111,509 B2 9/2006 Laun
2009/0282892 A1* 11/2009 Sai ........................ G01F 23/284 73/1.73

(Continued)

FOREIGN PATENT DOCUMENTS

CN 109490342 A 3/2019
CN 112763023 A 5/2021
CN 113272629 A 8/2021

(Continued)

*Primary Examiner* — Resha Desai
*Assistant Examiner* — Remash R Guyah
(74) *Attorney, Agent, or Firm* — Sterne, Kessler, Goldstein & Fox P.L.L.C.

(57) ABSTRACT

A method of putting into operation level measurement apparatus is provided. The method may include detecting, by means of a radar sensor unit of the level measuring device, an echo curve, wherein the echo curve comprises at least a first echo; selecting, from the echo curve, the first echo corresponding to a first distance and having a first amplitude, the first amplitude having the highest amplitude of the echo curve; determining a calculated first amplitude, wherein the calculated first amplitude is a function of the first distance; and if the first amplitude is higher than the calculated first amplitude, evaluating the echo curve as acceptable for putting into operation the measuring device.

14 Claims, 4 Drawing Sheets

(56) References Cited

U.S. PATENT DOCUMENTS

| | | | | |
|---|---|---|---|---|
| 2016/0098500 | A1 | 4/2016 | Haran et al. | |
| 2019/0107426 | A1* | 4/2019 | Welle | G01S 13/88 |

FOREIGN PATENT DOCUMENTS

| | | | |
|---|---|---|---|
| EP | 3 097 391 | B1 | 4/2020 |
| EP | 3 857 182 | B1 | 1/2023 |
| WO | WO-2017/146871 | A1 | 8/2017 |

* cited by examiner

METHOD FOR PUTTING A LEVEL MEASURING DEVICE INTO OPERATION

CROSS-REFERENCE TO RELATED APPLICATIONS

This application claims priority to European Patent Application No. 21 206 634.4 filed on 5 Nov. 2021, the entire content of which is incorporated herein by reference.

FIELD OF INVENTION

The invention relates to a method for putting a level measuring device into operation. Furthermore, the invention relates to a level measuring device, a program element, a computer-readable medium and a use.

BACKGROUND

When commissioning, e.g., putting into operation, a level measurement device that uses, in particular, a radar sensor unit for the measurement, a large number of measurements are required in many cases in order to obtain a high level of safety and/or measurement accuracy after the level measurement device has been commissioned. For example, for a limit level measurement that is intended to detect only an upper and lower limit of the level in the vessel, at least two measurements are required for commissioning. For a level measurement (so-called range monitoring), five measurements are required in many cases. For each of these measurements, a medium is filled into the vessel at the desired level. Such measurements can cause a certain—sometimes high—expenditure of material and time.

SUMMARY

There may be a desire to reduce the number of measurements during a start-up (putting into operation) of a level measuring device (level meter) in at least some cases.

One aspect relates to a method of commissioning a level measuring device arranged to measure a level of a product in a container. The method comprises the following steps:

- detecting, by means of a radar sensor unit of the level meter, a (detected) echo curve, wherein the echo curve comprises at least a first echo;
- selecting, from the (detected) echo curve, the first (detected) echo having a first distance and a first amplitude, the first amplitude having the highest amplitude of the echo curve;
- determining a calculated first amplitude, wherein the calculated first amplitude is a function of the first distance;
- if the (detected) first amplitude is higher than the calculated first amplitude, rate the echo curve as acceptable for start-up of the level measuring device.

When the level measuring device is put into operation, the vessel whose level, limit level and/or topology is to be measured can be empty or (at least partially) filled with a medium. It may be useful not to fill the container completely, so that the medium is at least a few centimeters away from a so-called "close range" of the radar sensor unit.

During a measurement, the radar sensor unit of the level measuring device detects the echo curve. The detection of the echo curve can be realized, for example, in such a way that radar waves—generated, for example, by a transmitter of the radar sensor unit—reflected by the medium and/or by parts of the container are received by a receiver of the radar sensor unit. The received reflected radar waves are then converted, e.g. in an evaluation unit (and/or in the radar sensor unit) of the level meter, into the so-called echo curve. For the measurement, e.g. an FMCW method (FMCW: frequency modulated continuous wave radar), a pulse radar and/or other radar methods can be used. The echo curve is often displayed in a diagram whose x-axis represents a distance (usually linear) and whose y-axis represents an amplitude (usually logarithmic, e.g., linear in dB). A (local) maximum of the echo curve usually corresponds to a reflection, e.g. from the medium and/or from parts of the vessel. A global maximum usually occurs in the close range of the radar sensor unit and is generated e.g. by reflections from a horn antenna of the radar sensor unit. In practice, it has been shown that not only desired maxima appear in such an echo curve, but also disturbances that can falsify the measurement. The disturbances can have many different causes.

An echo curve of a real measurement has at least one echo. If the echo curve has more than one echo, then the one whose amplitude has the highest amplitude of the echo curve is selected as the "first echo" from the multitude of echoes. An amplitude in the near range of the transmitter (which may be higher than the amplitude of the first echo) can be neglected in at least some cases. If the echo curve has only one echo, then this is selected as the "first echo". The distance of the first echo is called "first distance" and the amplitude of the first echo is called "first amplitude".

The calculated first amplitude results from the application of a function to the first distance. The function can represent a decrease in the intensity of the reflected radar wave, as it occurs, for example, when the product surface moves away from an antenna of the transmitter. It is assumed that the product surface reflects radar waves strongly, as is the case, for example, with liquids, or also with a reflection from the bottom of the vessel. A product surface that does not strongly reflect radar waves would be, for example, a coarse-grained bulk material, and/or liquids with small DK-values (dielectric constants), such as LPG (Liquified Petroleum Gas), oils and solvents. The function may be calculated (e.g., inversely proportional) and/or derived from measurements. A reference point ("maximum value") of the function, from which this decrease in intensity can be calculated, can be obtained e.g. from empirically derived value, e.g. from the characteristics of different antenna systems.

If the first amplitude is higher than the calculated first amplitude, the echo curve can be evaluated as acceptable for commissioning. In many cases, commissioning can be completed with this. If the first amplitude is lower than the calculated first amplitude, this can have several causes. For example, interference may have occurred and/or the radar waves have been "swallowed" by the walls of the vessel, e.g., by internals in the vessel, by buildup, etc. If the first amplitude is lower than the calculated first amplitude, this can mean that measurements with the level measuring device can be faulty. Therefore, in this case, the echo curve will be evaluated as non-acceptable for commissioning. It may then be successful to perform several or additional measurements for commissioning.

With this method, it may therefore be possible to reduce the number of measurements during commissioning of a level measuring device in at least some cases. Advantageously, this can help to reduce the time and effort required for commissioning. In particular, it can help to save a plant operator from having to start up with medium, and the plant operator can still have a high level of safety during commissioning, or a large number of measurements during commissioning is only required in significantly fewer cases.

This can be all the more useful because starting up the switching points or the entire measuring range is not always feasible and/or desired by the plant operator, for example in cases where rapid commissioning is required or if no medium is available at the time of commissioning.

In some embodiments, the container is either empty or at least partially filled with a liquid. The liquid may also be an emulsion or suspension, for example. In particular, the fill surface of liquids can strongly reflect radar waves.

In some embodiments, for evaluating the measured echo curve as acceptable, the first amplitude is higher than the calculated first amplitude by a safety margin, where the safety margin is 1 dB, 2 dB, 5 dB, 10 dB, 15 dB, or more. The safety distance can take into account, for example, inaccuracies in the measurement caused, for example, by an irregular design of the vessel, its walls, by smaller internals, etc. This tightened criterion to evaluate the echo curve as acceptable for commissioning can reduce the number of “false positive” evaluations, sometimes significantly.

In an embodiment, the method comprises further steps of: determining at least a second echo, the second echo having a second distance and a second amplitude, the second distance being less than the first distance; and if the second amplitude is greater than a second reference amplitude of a reference echo curve at the second distance, evaluating the measured echo curve as non-acceptable for commissioning.

One or more second echoes can be measured. The second echoes can have a lower amplitude than the first echo. The second echoes can be caused, for example, by installations in the vessel, by buildup, etc., which are located between the product surface and the transmitting antenna.

In some embodiments, the reference echo curve substantially corresponds to an echo curve measured in an infinitely long empty vessel. Further, a tolerance band may be considered; e.g., +1 dB, +2 dB, +3 dB around a calculated reference echo curve.

In some embodiments, an echo from a close range of the level measuring device is neglected. For example, the close range of the level measuring device may have a distance of less than 10 cm or 20 cm from the transmitter (e.g., from a transmitter chip). The echo from the close range may be caused, for example, by a horn antenna (as a transmitting antenna), or by a so-called “dome”, e.g. a shaft, in which the transmitter is located and which in at least some cases is located at the top of an inner side of the vessel. The echo from the close range may have a high amplitude. The echo from the close range may exhibit so-called antenna ringing, e.g., interference caused, for example, during antenna coupling. The echo from the near range can be excluded from an evaluation—e.g. as a “real” echo, from a product surface—by a so-called “factory noise suppression” already at the manufacturer. In cases where no increased amplitude can be detected in the currently measured echo compared to the factory false signal suppression, the measurement can be evaluated as acceptable for commissioning.

One aspect relates to a level measuring device for measuring a level of a product in a container. The level measuring device comprises a radar sensor unit configured to transmit radar waves and to receive reflected radar waves, and an evaluation unit which is configured to convert the reflected radar waves into an echo curve and to evaluate the echo curve as described above and/or below. The radar sensor unit can, for example, use an FMCW method or a pulse radar for measurement. The radar sensor unit and the evaluation unit may in at least some cases be implemented as one integrated hardware—e.g. on the same board, or on the same chip.

One aspect relates to a use of a level measuring device as described above and/or according to following for measuring a level, a topology and/or a boundary level of a filling material in a container.

One aspect relates to a program element which, when executed on an evaluation unit of a level measuring device as described above and/or below and/or on another computing unit, instructs the evaluation unit and/or the computing unit to perform the method as described above and/or below.

One aspect relates to a computer-readable medium on which the program element described herein is stored.

It should also be noted that the various embodiments described above and/or below may be combined.

For further clarification, the invention is described with reference to embodiments illustrated in the figures. These embodiments are to be understood only as examples and not as limitations.

DETAILED DESCRIPTION OF EMBODIMENTS

Figure 1:
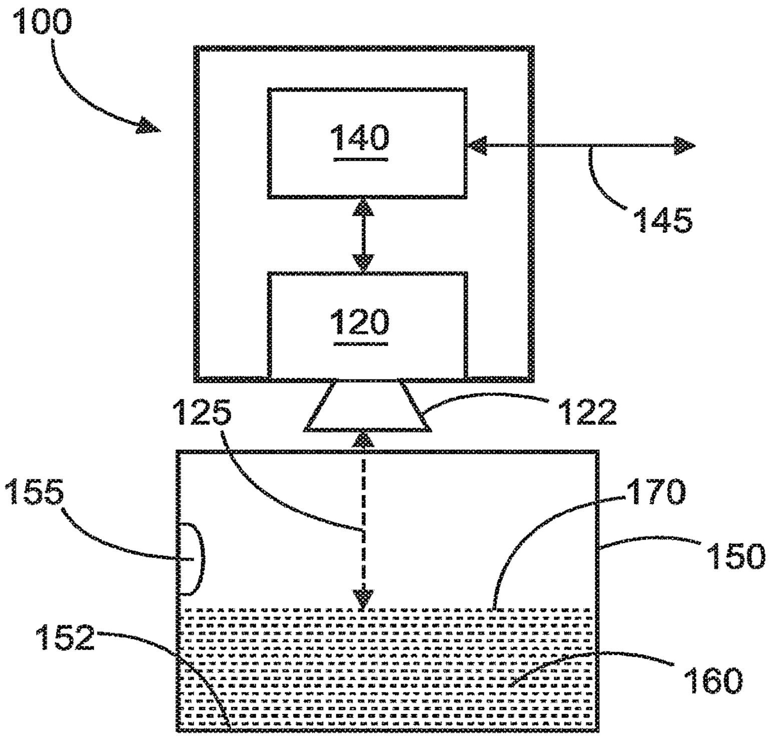
FIG. 1 schematically shows a level measuring device according to an embodiment.

FIG. 1 schematically shows a level measuring device 100 and a container 150 according to an embodiment. The level measuring device 100 and the container 150 are not shown to scale. In particular, the container 150 is generally significantly larger than the level measuring device 100. In at least some cases, the level measuring device 100 may be arranged in a so-called “dome”, for example a shaft, which in at least some cases is arranged at the top of an inner side of the container. The level measuring device 100 is arranged to measure a level 170 of a product (filling material) 160 in the container 150. The level measuring device 100 includes a radar sensor unit 120 configured to transmit radar waves and receive reflected radar waves 125. The transmission and reception of the radar waves is performed by means of the antenna 122, which is schematically shown here as a horn antenna. The reflected radar waves 125 are reflected, for example, from the product surface 170, and/or from a bottom 152 of the container 150. Furthermore, the radar waves can be reflected from internals and/or adhesions 155, in particular on or near a wall of the container 150. The reflected radar waves 125 are thereby received by the radar sensor unit 120 (via the antenna 122) and directed to an evaluation unit 140, which is set up to convert the reflected radar waves 125 into an echo curve 200 (see, for example, FIG. 2 or FIG. 3). The evaluation unit 140 is further set up to evaluate the echo curve 200, as described above and/or below. The evaluated measured values are then transmitted to further systems, e.g. to a control station, by means of a line 145. The line 145 may, for example, be implemented as a two-wire system and/or support other protocols. The line 145 can also lead, for example, to a radio module that can transmit the measured values wirelessly.

To put the level measuring device 100 into operation, the level measuring device 100 is arranged on or in the container 150, e.g. on top of the container 150 or in a so-called "dome" (not shown). Radar waves may then be transmitted to the level measuring device 100, and an echo curve 200 may be formed from the reflected radar waves 125. The echo curve 200 can then be evaluated, and in at least some cases, a decision can be made based on the echo curve 200 as to whether the echo curve 200—and thus the level measuring device 100—is judged acceptable for use.

Figure 2:
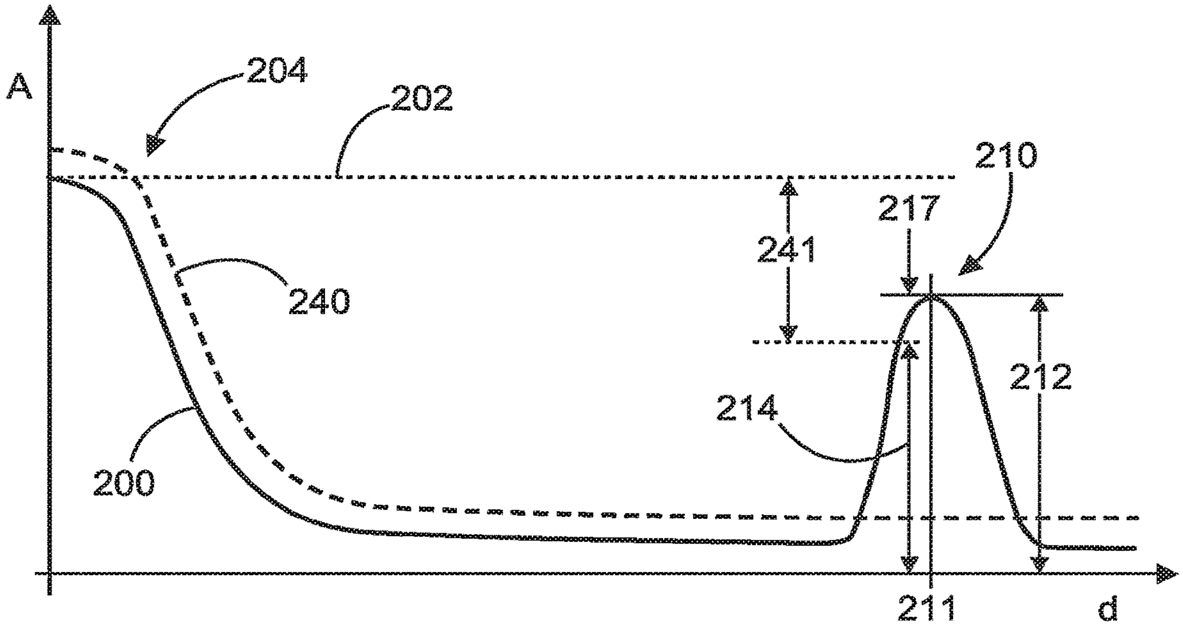
FIG. 2 shows an example of an echo curve according to an embodiment.

FIG. 2 shows an example of an echo curve 200 according to an embodiment measured, for example, in an empty container 150 or a container 150 at least partially filled with a liquid (see, for example, FIG. 1). The echo curve 200 is shown in a diagram whose x-axis represents a distance d, in linear representation, and whose y-axis represents an amplitude A, in dB. For example, the origin may have an amplitude value A=0 dB and a distance d=0 m from the transmitter. In this case, the highest amplitude 202 of the echo curve 200 is measured in the immediate vicinity of the transmitter. Furthermore, a close range 204 exhibits high amplitude values. Because amplitude values measured in the close range 204 usually do not represent "useful information", e.g., a reflection from a product surface, echoes from the near range can be excluded from an evaluation already at the manufacturer, e.g. by a so-called "factory interference signal suppression". This can be done, for example, by subtracting a calculated echo curve 240 from the measured echo curve 200 (before evaluation of the echo curve). The calculated echo curve or reference echo curve 240 may substantially correspond to an echo curve measured in an infinitely long empty vessel. Further, a tolerance band may be considered for the reference echo curve 240, e.g., +1 dB, +2 dB, +3 dB added to a calculated reference echo curve.

When the level measuring device is put into operation, the echo curve 200 can then be evaluated. In this case, the echo curve 200 exhibits a first echo 210 during real measurement. The first echo 210 may, for example, (in the case of an at least partially filled container) have been reflected from the product surface 170 or (in the case of an empty container) from a bottom 152 of the container 150. In the case of an at least partially filled container, the echo curve 200 can also have (at least) two echoes, namely from the product surface 170 and from the bottom 152; in this case, the echo from the bottom 152 has a lower amplitude than the echo from the product surface 170, in particular a substantially lower amplitude. The first echo 210 has a first distance 211 and a first amplitude 212. The echo which has the highest amplitude of the echo curve 200—apart from the echoes from the close range 204—can be selected as the first echo 210. The first echo 210 may be determined, for example, by the fact that it protrudes highest from the reference echo curve 240. Further, a calculated first amplitude 214 may be determined, wherein the calculated first amplitude 214 is a function of the first distance 211. For example, a function that monotonically decreases with distance d may be used, which is then applied to the highest amplitude 202 and, by subtracting an amplitude value 241 from the highest amplitude 202, yields the calculated first amplitude 214. In the example of FIG. 2, the first amplitude 212 is higher than the calculated first amplitude 214, even by a safety margin 217 is higher than the calculated first amplitude 214. Therefore, the echo curve 200 shown in FIG. 2 is judged to be acceptable for commissioning.

Figure 3:
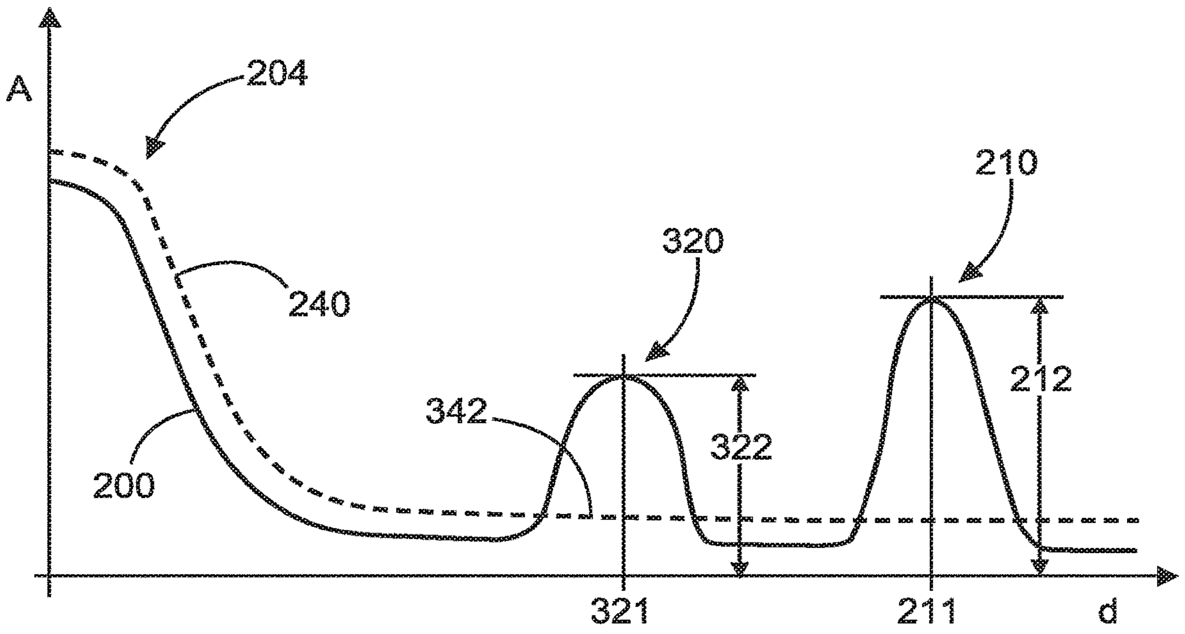
FIG. 3 shows another example of an echo curve according to an embodiment.

FIG. 3 shows another example of an echo curve 300 according to one embodiment. Same reference signs as in FIG. 2 denote same or similar elements. The echo curve 300 shows, in addition to the first echo 210, a second echo 320. In real measurements, one or more second echoes 320 may be measured. The second echoes 320 may have a lower amplitude than the first echo 210. The second echoes 320 can be caused, for example, by installations in the container, by adhesions 155 (see FIG. 1), etc., which are arranged between the product surface and the transmitting antenna. The second echo 320 shown in FIG. 3 has a second distance 321 and a second amplitude 322, where the second distance 321 is smaller than the first distance 211. If the second amplitude 322 is larger than a second reference amplitude 342 of a reference echo curve 240 at the second distance 321, the measured echo curve is evaluated as non-acceptable for commissioning.

In some embodiments, echoes from the close range 204 may also be considered. In this regard, in cases where an increased amplitude is seen in the currently measured echo compared to the factory noise suppression, the measurement may be judged to be unacceptable for commissioning.

Figure 4:
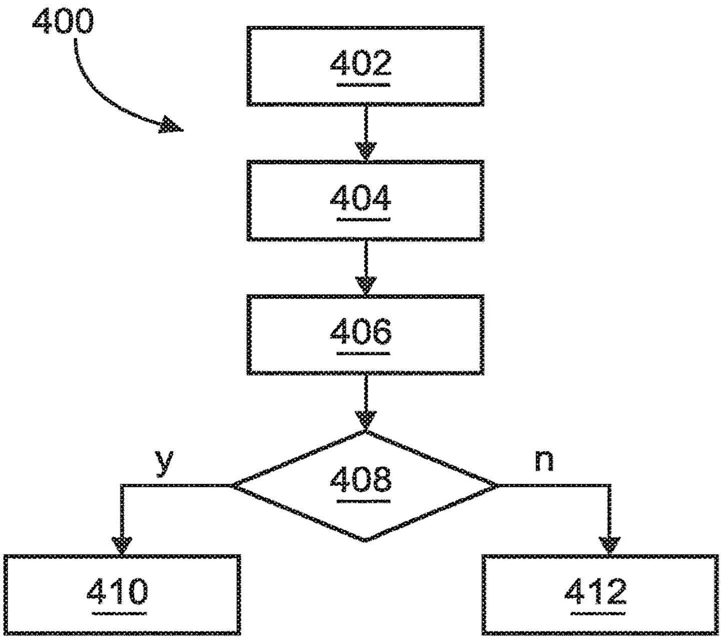
FIG. 4 shows flowchart depicting a method according to an embodiment.

FIG. 4 shows a flowchart 400 with a method for commissioning a level measuring device 100 (see, e.g., FIG. 1) according to one embodiment. In a step 402, an echo curve 200 (see e.g. FIG. 2 or FIG. 3) is acquired, by means of a radar sensor unit 120 of the level measuring device 100, wherein the echo curve 200 comprises at least a first echo 210. In a step 404, a first echo 210 having a first distance 211 and a first amplitude 212 is selected from the echo curve 200. Here, the first amplitude 212 has the highest amplitude of the echo curve 200 (excluding the amplitudes in the close range 204). In a step 406, a calculated first amplitude 214 is determined, wherein the calculated first amplitude 214 is a function of the first distance 211. In a step 408, it is queried whether the first amplitude 212 is higher than the calculated first amplitude 214. If the first amplitude 212 is higher than the calculated first amplitude 214, in a step 410, the echo curve 200 is evaluated as acceptable for commissioning. Otherwise, in a step 412, the echo curve 200 is evaluated as unacceptable—for commissioning. In this case, additional measurements can be performed for commissioning, for example.

Figure 5:
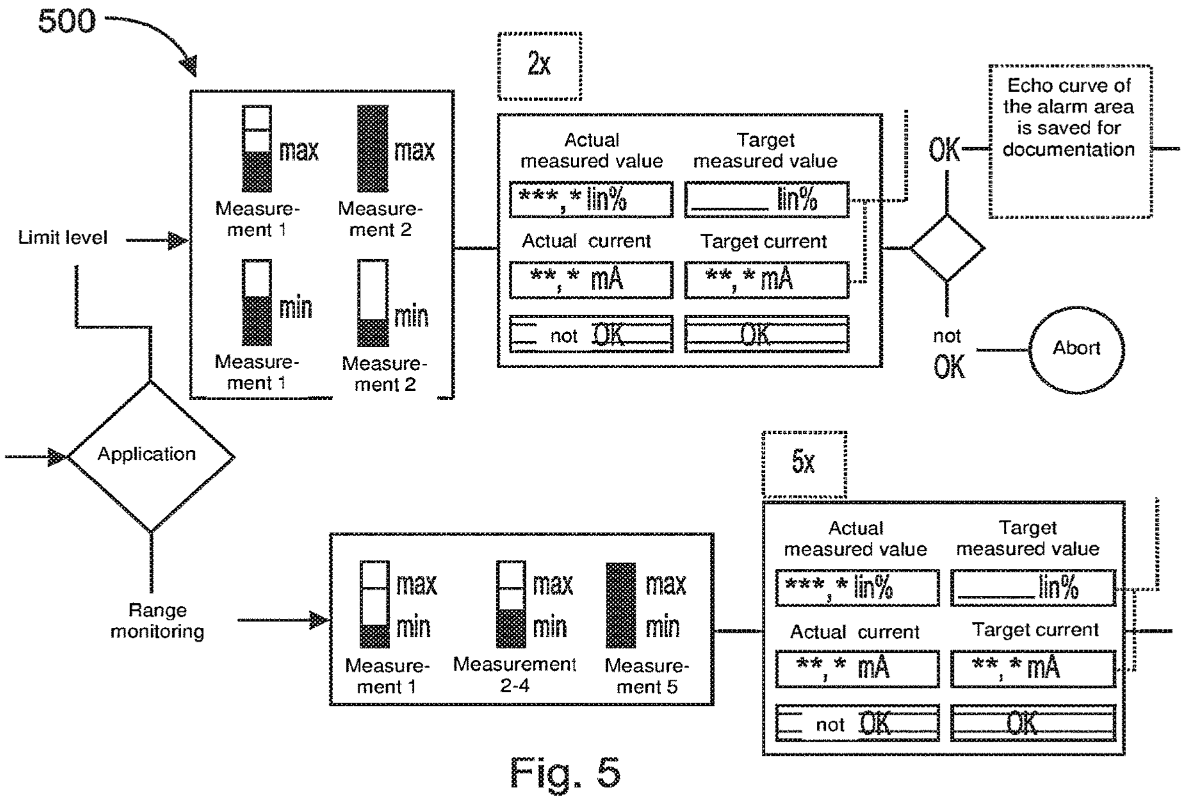
FIG. 5 commissioning scenario according to an embodiment.

FIG. 5 shows a commissioning scenario 500 according to an embodiment. Here, at least two measurements are required for an application for measuring a limit level of a product, for example a measurement of an upper level ("max") in the container and a lower level ("min"). An echo curve is recorded and evaluated by means of a radar sensor unit. For each limit level, an actual measured value is recorded, which corresponds to an actual current, e.g. in a two-wire system—such as according to a HART protocol (Highway Addressable Remote Transducer). This actual measured value or actual current is—compared—with a target measured value or target current. —Based on these readings, a level measuring device used to measure the limit level—can be evaluated as acceptable for commissioning. If the measurements are correct, the values can be stored, e.g. for documentation. If the measurements are not correct, commissioning can be aborted.

An application for measuring a level of a product requires at least five measurements, for example a "max" measurement at an upper level, a "min" measurement at a lower level and e.g. three further measurements with further selected levels. For each limit level, one actual measured value is recorded, which corresponds to an actual current, for example. This actual measured value or actual current is —compared—with a target measured value or target current. Based on these measured values, a level measuring device for measuring the level and/or a topology can be evaluated as acceptable for commissioning. The values can, in case of correct measurements, be stored e.g. for documentation. In case of non-correct measurements, the commissioning can be aborted.

In at least some cases, the commissioning scenario can be shortened, particularly for applications of any of the processes as described above and/or below.

Figure 6:
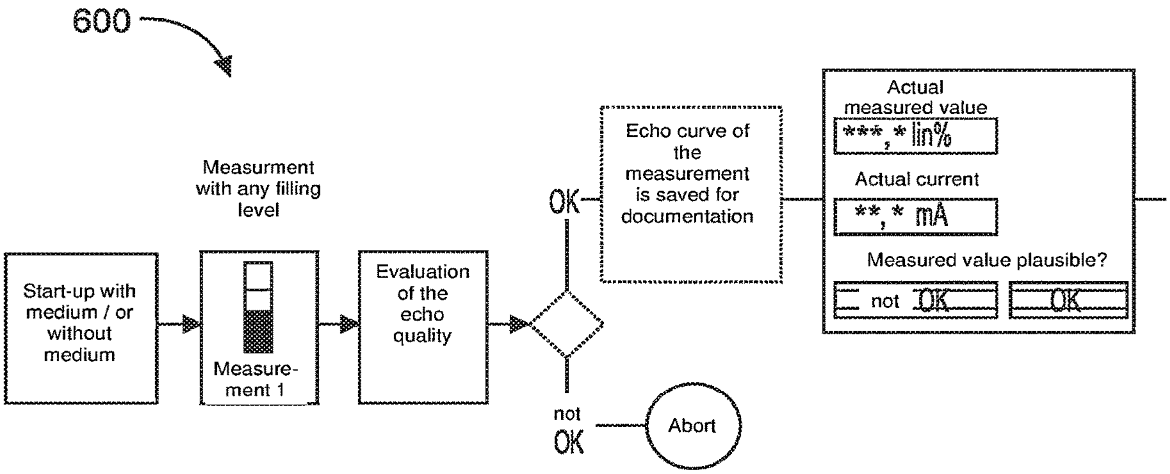
FIG. 6 shows a start-up scenario according to a further embodiment.

FIG. 6 shows a start-up scenario 600 according to a further embodiment. Here, a container 150 (see e.g. FIG. 1) can be at least partially filled or empty, e.g., a start-up can take place without a medium or with a medium, with any filling level. If there is an agitator in the vessel intended for the measurement, differentiation can be made according to the position of the agitator: If the agitator is located in the measuring channel of the radar sensor, a different type of commissioning can be selected. If the agitator is not in the measuring channel of the sensor, the procedure as described above and/or below can be used.

Subsequently, the echo quality can be evaluated as described above and/or below. If the measurements are correct, the values can be saved, e.g. for documentation. If the measurements are not correct, the commissioning can be aborted. Alternatively or additionally, measurements can be performed as e.g. for the commissioning scenario 500 (see above).

Figure 7:
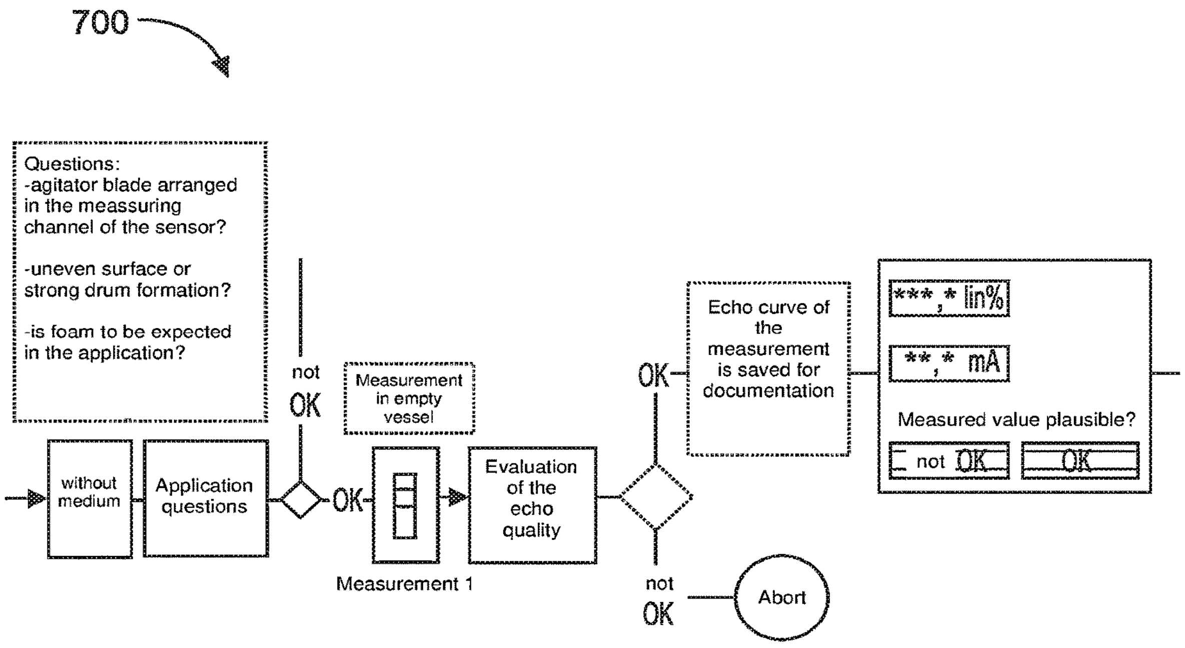
FIG. 7 shows a start-up scenario according to a further embodiment.

FIG. 7 shows a commissioning scenario 700 according to a further embodiment, wherein an agitator is arranged in the vessel. If the agitator is arranged in the measuring channel of the radar sensor, a different type of commissioning can be selected. If the agitator is not in the measuring channel of the sensor, the method as described above and/or below can be used. In this case, the container may be empty; for example, there may be no possibility to fill in a medium. The sensor is installed in or on the container and measures the empty container. A measuring range—e.g. "from . . . to", or "max"—can be specified by the system operator and/or by service personnel. Then an interactive step can be provided, e.g., a plant operator (etc.) can be asked if the measurement is plausible. If this is confirmed, then the sensor can be considered as "correctly set". The first large echo can thus be interpreted as a reflection in the area of the vessel bottom. In a further step, the area between the antenna and the end of the measuring range can be divided into two areas: Into a close range 204 (see e.g. FIG. 2 or FIG. 3) and into a remaining area. In the close range 204, a so-called "factory interference signal suppression can be applied, which subtracts a calculated echo curve or reference echo curve 240 from the currently measured echo curve 200. If the currently measured echo curve 200 does not show an increased amplitude compared to the factory interference signal emission, the measurement can be evaluated as acceptable for commissioning. Since the amplitudes in the close range 204 typically have a high intensity, these can be detected well after subtraction from the reference echo curve 240.

For the remaining area, the following scheme can be applied:

- If no echo is detected in this range, the measurement is considered acceptable for commissioning.
- If an echo is detected in this range, the amplitude of this echo must be evaluated. The sensor setting can be used for this purpose. If an aqueous solution is expected, higher amplitudes can be tolerated than if an oily liquid with a smaller useful echo amplitude is expected.

Other options for echo curve evaluation may include: If a medium or product is present in the vessel, it may be possible to evaluate multiple echoes. If multiple echoes are present, the sensor or the operating tool can compare the amplitude of the multiple echoes with the amplitude of the level echo. If the multiple echoes are sufficiently smaller than the level echo, the measurement is considered acceptable for commissioning in this aspect. Multiple echoes outside the actual measuring range can also be used for evaluation.

In order to assess an acceptable measurement, it is possible, for example, to refer to settings or parameters that have been entered by a specialist, e.g. by service personnel. In addition to information about the medium, this can also be information about the application or the vessel.

Information about the medium may include, for example:

- Medium type bulk material: Here, the echo amplitudes can vary greatly. The measurement can therefore be more difficult.
- Fluid medium type: The DK value can be considered here. If this is smaller than 2, for example, then the reflectance property may be too low and it may make sense to select a non-automated process for commissioning.
- DK value: For small DK values, the method shown may have limited applicability.

Information about the application may include, for example:

- Storage tank: The measurement can be safer here, since only slow level changes are to be expected.
- Dosing tank: Here, rapid level changes are to be expected, which is why it can be advantageous to use larger safeties—e.g. a larger safety distance.

Information about the container may include, for example:

- Agitator present: The unsteady surface can generate strongly fluctuating echo amplitudes, which is why a reliable measurement is hardly possible.
- Clobber-shaped vessel top: This vessel geometry can generate stronger multiple echoes.

Figure 8:
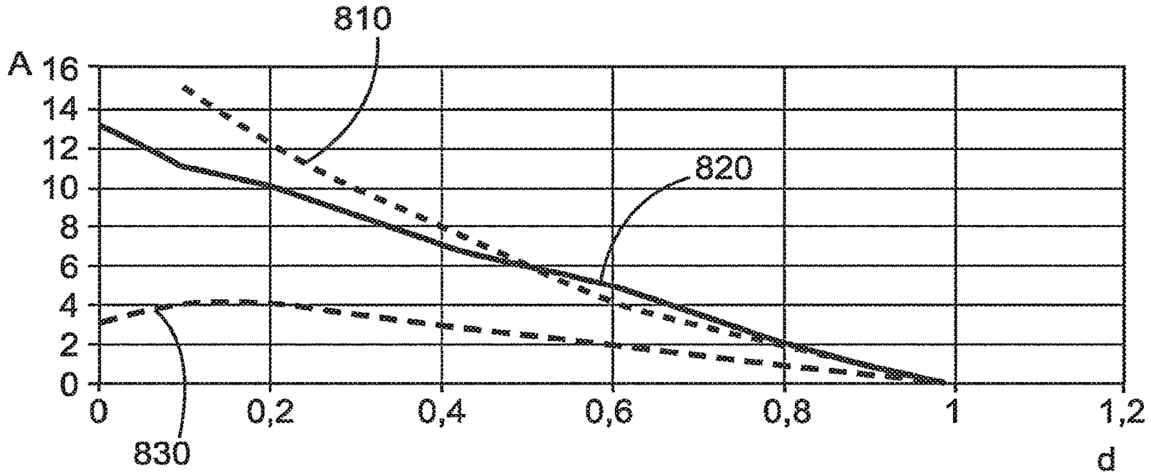
FIG. 8 shows examples of echo amplitudes according to a further embodiment.

FIG. 8 shows some examples of echo amplitudes according to a further embodiment. The echo amplitudes are shown as a section of an echo curve 200, whose x-axis represents a distance d in meters and whose y axis represents an amplitude A in dB. Here, a curve 810 shows an expected increase in amplitude for a flanged antenna system. A curve 820 shows an expected increase in amplitude for an antenna system with thread. A curve 830 shows an expected increase in amplitude for an antenna system with a horn antenna. These curves can be used, depending on the antenna used, e.g. as a reference echo curve.

LIST OF REFERENCE SIGNS

100 Level measuring device
120 Radar sensor unit
122 Antenna
125 reflected radar waves
140 Evaluation unit
145 Line
150 Container
152 Bottom of vessel
155 Adhesions
160 Filling material
170 Fill level, product surface
200 Echo curve

202 Highest amplitude
204 Close range
210 First echo
211 First distance
212 First amplitude
214 Calculated first amplitude
217 Safety distance
240 Calculated echo curve, reference echo curve
241 Amplitude value
242 Second reference amplitude
300 Echo curve
320 Second echo
321 Second distance
322 Second amplitude
342 Second reference amplitude
400 Flow diagram
402 412 steps
500 700 Start-up scenarios
810 830 Curves

What is claimed is:

1. A method of putting into operation a level measuring device, comprising the steps of:

detecting, by means of a radar sensor unit of the level measuring device, an echo curve, wherein the echo curve comprises at least a first detected echo;

selecting, from the echo curve, the first detected echo corresponding to a first detected distance and having a first detected amplitude, the first detected amplitude having the highest amplitude of the echo curve apart from a close range of the echo curve;

determining a first calculated amplitude, wherein the first calculated amplitude is a function of the first detected distance;

in response to determining the first detected amplitude is higher than the first calculated amplitude, evaluating the echo curve as acceptable for putting into operation the level measuring device; and upon evaluating the echo curve as acceptable for putting into operation the level measuring device, putting the level measuring device into operation, wherein the method is performed during an initial commissioning phase with a container in an empty state or partially filled state, and wherein putting the level measuring device into operation does not require filling the container to multiple predetermined levels calibration, and wherein the level measuring device is configured to measure a level, a topology, and/or a limit level of a filling material in a container, the level measuring device comprising:

the radar sensor unit configured to transmit radar waves and to receive reflected radar waves; and a computing unit which is configured to convert reflected the radar waves into an echo curve and to evaluate the echo curve.

2. The method according to claim 1, wherein the container is either empty or at least partially filled with a liquid.

3. The method according to claim 1, wherein the first calculated amplitude is a function of the first detected distance.

4. The method according to claim 1, wherein, for evaluating the echo curve as acceptable, the first detected amplitude is higher than the first calculated amplitude by a safety margin, the safety margin being 1 dB, 2 dB, 5 dB, 10 dB, 15 dB, or more.

5. The method according to claim 1, further comprising:

determining at least a second detected echo in the echo curve, the second detected echo corresponding to a second detected distance and having a second detected amplitude, the second detected distance being less than the first detected distance; and if the second detected amplitude is greater than a second reference amplitude of a reference echo curve at a location corresponding to the second detected distance, evaluating the echo curve as unacceptable for putting into operation the level measuring device, wherein the second reference amplitude of the reference echo curve at the second detected distance corresponds to an echo curve measured at the second detected distance in an infinitely long empty container.

6. The method according to claim 5, wherein the reference echo curve substantially corresponds to an echo curve measured in an infinitely long empty container.

7. The method according to claim 1, wherein a detected echo from the close range of the level measuring device is neglected.

8. The method according to claim 1, wherein the function of the first detected distance is calculated.

9. The method according to claim 1, wherein the first calculated amplitude is a function of the first detected distance, and the function of the first detected distance is obtained from empirical values.

10. The method according to claim 1, wherein the function of the first detected distance is obtained from characteristics of different antenna systems.

11. The method according to claim 1, further comprising the step of:

when an increased amplitude is seen in the currently measured echo compared to a factory noise suppression, the measurement is judged as unacceptable for commissioning.

12. The method according to claim 1, further comprising the step of:

for an empty container, when no further echo, except an echo from the container bottom and from a close range, is detected, the measurement is judged as acceptable for commissioning.

13. The method according to claim 1, wherein putting the level measuring device into operation comprises evaluating whether an installation of the level measuring device is acceptable for putting into operation the level measuring device.

14. A non-transitory computer-readable storage medium having a program stored therein, which when executed by a computing unit performs the method according to claim 1.

* * * * *